United States Patent
Ishida et al.

(10) Patent No.: US 9,261,034 B2
(45) Date of Patent: Feb. 16, 2016

(54) GAS ENGINE CONTROL DEVICE

(75) Inventors: Michiyasu Ishida, Tokyo (JP); Minoru Esaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 320 days.

(21) Appl. No.: 14/000,708

(22) PCT Filed: Mar. 31, 2011

(86) PCT No.: PCT/JP2011/058253
§ 371 (c)(1),
(2), (4) Date: Sep. 6, 2013

(87) PCT Pub. No.: WO2012/131990
PCT Pub. Date: Oct. 4, 2012

(65) Prior Publication Data
US 2014/0020668 A1    Jan. 23, 2014

(51) Int. Cl.
*F02D 41/00* (2006.01)
*F02D 41/08* (2006.01)
(Continued)

(52) U.S. Cl.
CPC .............. *F02D 41/08* (2013.01); *F02D 19/021* (2013.01); *F02D 19/029* (2013.01); *F02D 41/0027* (2013.01); *F02D 31/007* (2013.01);
(Continued)

(58) Field of Classification Search
CPC ....... F02D 41/00; F02D 41/08; F02D 19/021; F02D 41/0027; F02D 2200/101; Y02T 10/32
See application file for complete search history.

(56) References Cited

U.S. PATENT DOCUMENTS

| 5,791,145 A | 8/1998 | Freen |
| 8,464,517 B2 * | 6/2013 | Fujita .................. B01D 53/9431 60/286 |
| 2009/0071439 A1 | 3/2009 | Shiraishi et al. |

FOREIGN PATENT DOCUMENTS

| CN | 201314256 Y | 9/2009 |
| CN | 101952581 A | 1/2011 |

(Continued)

OTHER PUBLICATIONS

Japan Patent Office, "Written Opinion of the International Searching Authority for PCT/JP2011/058253," Oct. 10, 2013.
(Continued)

*Primary Examiner* — Hieu T Vo
(74) *Attorney, Agent, or Firm* — Manabu Kanesaka

(57) ABSTRACT

It is an object of the invention to achieve a stable idling revolution speed in a short time and to prevent easily the occurrence of abnormal combustion, misfire, or the like by effectively controlling a gas flow rate adjustment valve even in a case where a fuel gas which tends to fluctuate in fuel gas concentration, as represented by a coal mine gas, is used. The invention includes a revolution speed detection part 5 detecting the revolution speed of a gas engine 1, a gas concentration detection unit 7 detecting the gas concentration of a fuel gas, a gas flow rate adjustment valve 4 disposed in a fuel gas pipeline 3 supplying a fuel gas to the gas engine 1, a governor actuator 21 for operating the gas flow rate adjustment valve 4, and an operation amount computation part 15 computing the operation amount of the governor actuator 21 according to the gas concentration of the fuel gas detected by the gas concentration detection unit 7; and a governor controller 10 operating the governor actuator 21 based on the operation amount computed by the operation amount computation part 15 is further provided.

7 Claims, 7 Drawing Sheets

(51) Int. Cl.
  *F02D 19/02*    (2006.01)
  *F02D 41/06*    (2006.01)
  *F02D 31/00*    (2006.01)

(52) U.S. Cl.
  CPC ......... *F02D41/062* (2013.01); *F02D 2200/101* (2013.01); *Y02T 10/32* (2013.01)

(56) References Cited

FOREIGN PATENT DOCUMENTS

| | | |
|---|---|---|
| JP | S56-118533 A | 9/1981 |
| JP | H09-032648 A | 2/1997 |
| JP | 1997-268923 A | 10/1997 |
| JP | 1999-036991 A | 2/1999 |
| JP | 2003-148187 A | 5/2003 |
| JP | 3500047 B2 | 2/2004 |
| JP | 3653031 B2 | 5/2005 |
| JP | 2007-100581 A | 4/2007 |
| JP | 2008-002271 A | 1/2008 |
| JP | 2009057870 A | 3/2009 |

OTHER PUBLICATIONS

Japan Patent Office, "International Search Report for PCT/JP2011/058253," May 24, 2011.

Japan Patent Office, "Decision to Grant a Patent for JP 2013-506997," Mar. 27, 2015.

China Patent Office, "First Office Action for CN 201180069408.9," Mar. 20, 2015.

Europe Patent Office, "Search Report for EP 11862573.0," Sep. 2, 2015.

* cited by examiner

GAS ENGINE CONTROL DEVICE

RELATED APPLICATIONS

The present application is National Phase of International Application No. PCT/JP2011/058253 filed Mar. 31, 2011.

TECHNICAL FIELD

The present invention relates to a gas engine control device using an electronic governor, and more particularly, relates to a gas engine control device capable of preventing easily the occurrence of abnormal combustion, misfire, or the like even in a case where a coal mine gas, which tends to fluctuate in gas concentration, or other low-concentration fuel gases are used.

BACKGROUND ART

With a gas engine in which a combustible gas such as methane or propane is directly introduced into a cylinder (combustion chamber) to be combusted, the ratio between the fuel gas and air is changed by a gas flow rate adjustment valve disposed at the fuel gas path to the engine. As a result, sure ignition and combustion are allowed. In addition, the output of the engine is changed by adjusting the gas flow rate with the gas flow rate adjustment valve, and a governor actuator for driving the gas flow rate adjustment valve.

Japanese Patent Publication No. 3500047 (Patent Document 1) discloses a technology of adjusting the amount of the fuel gas to be supplied. The accompanying FIG. 8 shows the outline of fuel control and the like of the related-art technology. In FIG. 8, 01 represents an engine; 02 represents a crank shaft of the engine 01; 03 represents a fuel gas pipeline; 04 represents a gas flow rate adjustment valve disposed in the fuel gas pipeline 03; and 020 represents an electronic governor. Whereas, 010 represents a governor controller of the electronic governor 020; and 021 represents a governor actuator for driving the gas flow rate adjustment valve 04.

According to the Patent Document 1, the governor controller 010 compares the detected value of the engine revolution speed inputted from a revolution detector 05 and the set revolution speed, and calculates the fuel gas flow rate equivalent to the revolution speed deviation, and outputs the calculated value to the governor actuator 021. The governor actuator 021 changes the gas flow rate adjustment valve 04 by the amount equivalent to the flow rate deviation. As a result, the gas engine 01 is operated at the set revolution speed.

FIG. 9 is a diagram showing a change in engine revolution speed and a change in governor actuator output after start of the gas engine of the related-art technology. At the revolution speed between the start and the idling revolution speed N2 at the engine 01, there is set a revolution speed transition point N1 at which the output of the governor actuator 021 for controlling the gas flow rate adjustment valve 04, in other words, the increasing rate of the fuel limiting value is changed.

Between the engine stop and the revolution speed transition point N1, the increasing rate α1 of the governor actuator output S from a point a equivalent to the governor actuator output S1 set as the initial limiting value of the fuel gas flow rate at the start to a point b equivalent to the governor actuator output S2 at the revolution speed transition point N1 and the increasing rate α2 of the governor actuator output S from the revolution speed transition point N1 to a point c equivalent to the governor actuator output S3 at the idling revolution speed N2 are set in the relationship of α2>α1.

Then, by setting the fuel gas flow rate limiting value S2 at the revolution speed transition point N1, and the fuel gas flow rate limiting value S3 at the idling revolution speed N2, the amount of the fuel gas to be supplied is prevented from increasing more than necessary during the period until the idling revolution speed N2.

Therefore, the fuel gas flow rate limiting value from the governor actuator can be controlled so as to be changed properly following the increase in engine revolution speed at the start of the engine. This can inhibit the occurrence of the following situation: the fuel gas flow rate sharply increases upon start, so that the gas in the combustion chamber is in a rich state. Accordingly, after starting, a proper amount of the fuel gas is supplied to the engine combustion chamber, resulting in the implementation of the stable start free from the occurrence of misfire or knocking.

Patent Document 1: Japanese Patent Publication No. 3500047.

However, a gas engine using a combustible gas such as methane or propane as a fuel may use, particularly, methane with a low concentration generated in a coal mine or the like as a fuel.

In such a case, there is performed underground ventilation aiming at discharge of methane generated during the underground coal mining operation in a coal mine. The gas discharged to the outside of the underground tunnels is retained to be used as the fuel for the gas engine.

Therefore, the concentration of the retained methane is not invariably constant, and tends to vary.

On the other hand, when the gas is used as the fuel for the gas engine, it is a condition for obtaining an efficient operation that the ratio of air and the fuel gas ($CH_4$) falls within a given range.

For this reason, when the fuel gas discharged from a coal mine or the like is used, the fuel gas is required to be supplied to the combustion chamber of the engine in consideration of the concentration.

DISCLOSURE OF THE INVENTION

The present invention was made in order to solve such a problem. It is an object of the present invention to provide a stable idling revolution speed in a short time, and readily prevent the occurrence of abnormal combustion, misfire, or the like in the following manner: the gas flow rate adjustment valve is effectively controlled even in the case using a fuel gas which tends to fluctuate in fuel gas concentration such as a coal mine gas.

In order to solve such a problem, in accordance with the present invention, there is provided a control device of a gas engine using a fuel gas that exhibit gas concentration change. The device is characterized by including: a revolution speed detection part detecting a revolution speed of the gas engine; a gas concentration detection unit detecting a gas concentration of the fuel gas; a gas flow rate adjustment valve disposed in a fuel gas pipeline supplying the fuel gas to the gas engine; a governor actuator operating the gas flow rate adjustment valve; and a governor controller including an operation amount computation part computing an operation amount of the governor actuator according to the gas concentration of the fuel gas detected by the gas concentration detection unit upon starting the gas engine, this governor controller operating the governor actuator based on the operation amount computed by the operation amount computation part.

With such a configuration, the governor actuator can be operated according to the fuel gas concentration. Accordingly, a stable idling revolution can be obtained in a short time. Further, it is possible to readily prevent the occurrence of abnormal combustion, misfire, or the like.

Further, in the present invention, preferably, the gas engine control device has a first map in which an increasing rate of the operation amount of the governor actuator upon starting the gas engine is prescribed according to the gas concentration of the fuel gas. The device is characterized in that the governor controller includes a governor output increasing rate setting part reading from the first map the increasing rate of the operation amount of the governor actuator corresponding to the gas concentration of the fuel gas detected by the gas concentration detection unit, and in that the operation amount computation part computes the operation amount of the governor actuator based on the increasing rate.

With such a configuration, the increasing rate of the gas flow rate is prescribed in the first map. Accordingly, it is possible to rapidly perform control, which can provide a stable idling revolution in a short time.

Still further, in the present invention, preferably, the device is characterized in that in the first map a plurality of increasing rates are prescribed according to the revolution speed of the gas engine, and in that the operation amount computation part computes the operation amount of the governor actuator based on the increasing rate corresponding to the revolution speed detected by the revolution speed detection part.

With such a configuration, a plurality of increasing rates are prescribed according to the revolution speed of the gas engine. Accordingly, the gas flow rate increases properly following the increase in revolution speed. As a result, a proper amount of the fuel gas is supplied to the combustion chamber of the engine. This avoids the occurrence of such a situation as to cause the occurrence of misfire or knocking.

Whereas, in the present invention, preferably, the device is characterized in that the governor controller includes: an upper limit level setting part setting an upper limit value of the operation amount of the governor actuator according to the gas concentration of the fuel gas and the revolution speed detected by the revolution speed detection part, and a determination part comparing the operation amount computed by the operation amount computation part and the upper limit value of the operation amount, and operating the governor actuator based on the upper limit value when the operation amount is equal to or larger than the upper limit value.

The operation amount of the actuator increases with a lapse of time. For this reason, if the revolution speed of the engine does not increase for a reason of insufficient combustion, or the like, the fuel gas concentration in the combustion chamber of the engine increases, resulting in the occurrence of abnormal combustion or misfire. In the present invention, with the foregoing configuration, the upper limit value is selected according to the engine revolution speed. As a result, it is possible to prevent such abnormal combustion or misfire.

For example, also when the engine revolution speed does not increase as desired due to the instability of the fuel gas such as fluctuation of the gas concentration upon start with an engine revolution speed equal to or lower than the idling revolution speed, the operation amount of the governor actuator can be suppressed to the upper limit value or lower. For this reason, it is possible to readily prevent the occurrence of misfire or the like.

On the other hand, when the operation amount of the governor actuator is equal to or lower than the upper limit value, the governor output increasing rate setting part controls the increasing rate of the fuel gas flow rate according to the fuel gas concentration. Accordingly, stable idling revolution can be obtained in a short time.

Further, in the present invention, preferably, the device has a second map in which the upper limit value of the operation amount is prescribed according to the gas concentration of the fuel gas and the revolution speed of the gas engine. The device is characterized in that the upper limit level setting part reads from the second map the upper limit value corresponding to the gas concentration detected by the gas concentration detection unit, and sets the upper limit value of the operation amount.

With such a configuration, the upper limit value of the operation amount of the governor actuator is properly prescribed according to the fuel gas concentration. Accordingly, it is possible to rapidly perform control, which can provide a stable idling revolution in a short time.

Still further, in the present invention, preferably, the second map includes a diagram prescribing the upper limit value between a revolution speed corresponding to operation start by a main chamber gas and a revolution speed corresponding to idling, with the upper limit value being increased according to an increase in the revolution speed.

With such a configuration, the upper limit values can be densely set with an increase in revolution speed from engine stop to idling. Accordingly, not only stable idling revolution can be obtained in a short time, but also control is performed finely. This provides an effect of enabling avoidance of waste of the fuel.

Whereas, a feature of the present invention also resides in that there is provided a gas engine including any of the gas supply control devices described up to this point.

As described up to this point, in accordance with the present invention, the governor actuator can be operated according to the fuel gas concentration. For this reason, stable idling revolution can be obtained in a short time. Further, the occurrence of abnormal combustion, misfire, or the like can be prevented with ease.

BEST MODE FOR CARRYING OUT THE INVENTION

Below, the present invention will be described in details by way of embodiments shown in the accompanying drawings.

However, the dimensions, materials, shapes, the relative arrangement thereof, and the like described in the embodiments are, unless otherwise specified, not construed as limiting the scope of the invention only thereto, and are only mere illustrative examples.

Figure 1:
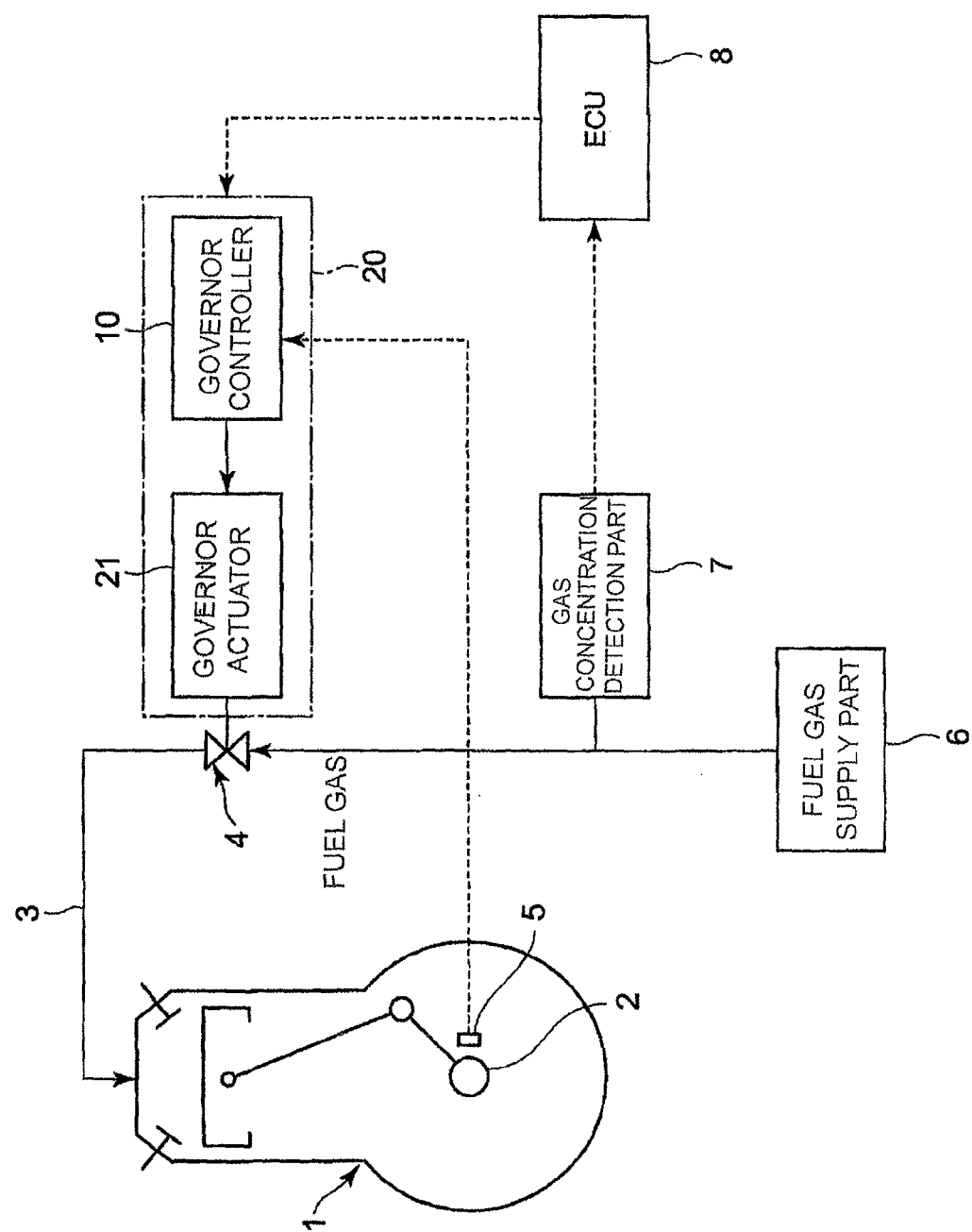
FIG. 1 shows a schematic view of a fuel control system of a gas engine in accordance with an embodiment of the present invention.

FIG. 1 shows a schematic view of a fuel control system of a gas engine in accordance with an embodiment of the present invention.

In FIG. 1, 1 is a gas engine (which will be hereinafter abbreviated as an "engine"); 2 is a crank shaft of the engine 1; 3 is a fuel gas pipeline for supplying a fuel gas retained in a fuel gas supply part 6 to the engine 1; 4 is a gas flow rate adjustment valve disposed at the fuel gas pipeline 3, and for adjusting the amount of the fuel gas to be supplied to the engine 1; 7 is a gas concentration detection part which is a gas concentration detection unit disposed in the fuel gas pipeline 3, and provided on the upstream side of the gas flow rate adjustment valve 4, and between the gas flow rate adjustment valve 4 and the fuel gas supply part 6; 20 is an electronic governor for controlling the revolution speed and the output of the engine 1; and 8 is an engine control unit ECT (which will be hereinafter abbreviated as an "ECU") for controlling the whole engine. Whereas, 10 provided in the electronic governor 20 is a governor controller; 21 is a governor actuator for driving the gas flow rate adjustment valve 4; and 5 is a revolution speed detector for detecting the revolution speed of the engine, and outputting the detected signal to the ECU 8 and the governor controller 10.

Figure 2:
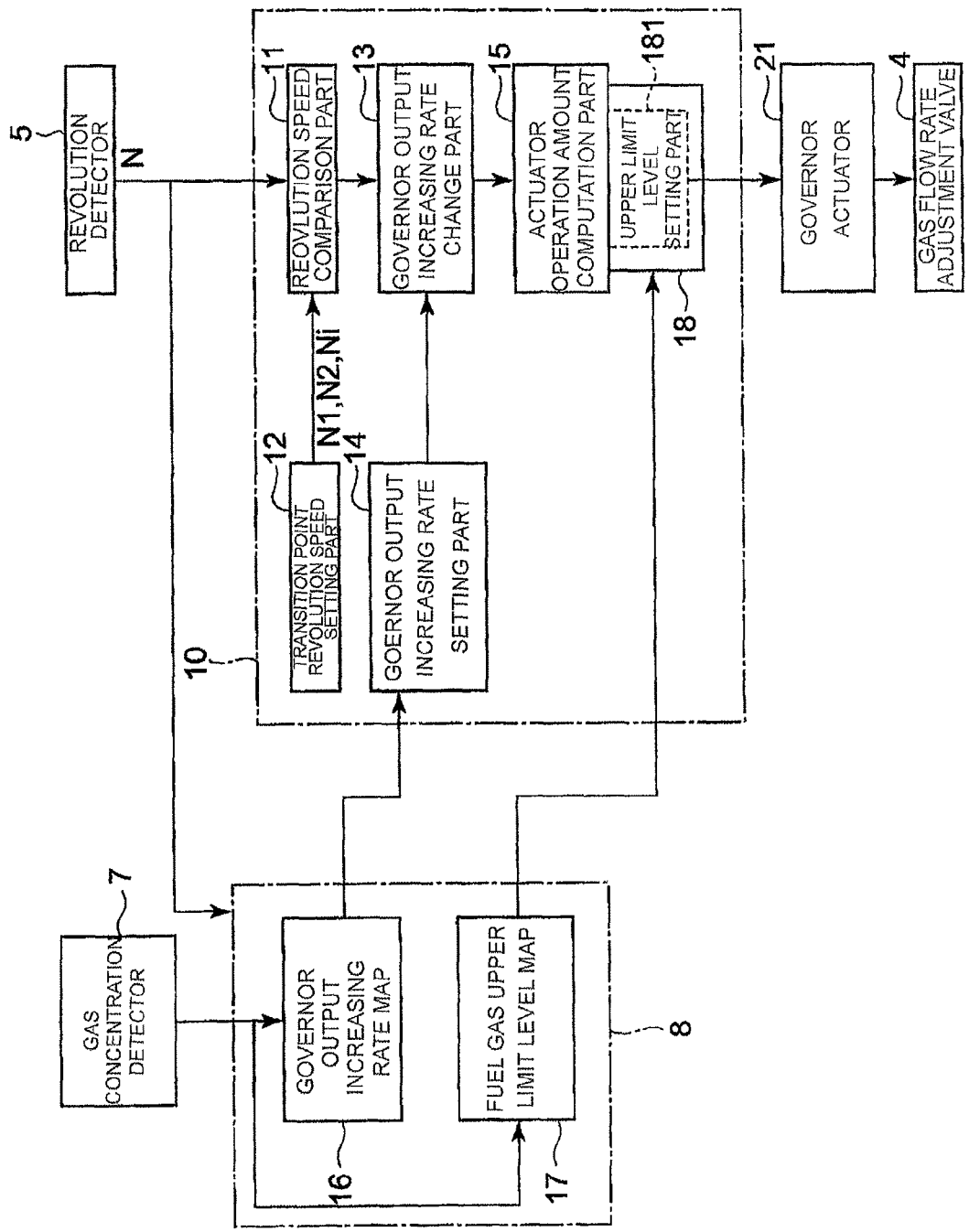
FIG. 2 shows a control block view of a governor controller in a fuel control device of the gas engine in accordance with the embodiment of the present invention.

As shown in FIG. 2, the governor controller 10 has a transition point revolution speed setting part 12 for performing control setting for increasing the revolution speed with time in a period between the start of the engine 1 and the idling revolution speed thereof; a revolution speed comparison part 11 for comparing the detected value (engine revolution speed) from the revolution speed detector 5 and the revolution speed set at the transition point revolution speed setting part 12; a governor output increasing rate setting part 14 for setting the governor output increasing rate; a governor output increasing rate change part 13 for changing the governor output based on the results of the revolution speed comparison part 11; and an actuator operation amount computation part 15 for computing on the basis of results obtained by governor output increasing rate change part 13 the operation amount of the governor actuator 21 (operation amount).

In the ECU 8, there are provided a governor output increasing rate map 16 for extracting a governor output increasing rate α based on the detected value of the gas concentration detector 7 which is a gas concentration detection part, and the revolution detector 5 for detecting the engine revolution speed; and a fuel gas upper limit level map 17 for extracting a fuel gas upper level SLi corresponding to the transition point revolution speed set when the actual revolution speed does not increase with respect to the engine revolution speed set at the transition point revolution speed setting part 12, and outputting the SLi to a determination part 18 also provided in the actuator operation amount computation part 15.

Then, the fuel gas upper limit level SLi extracted from the fuel gas upper limit level map 17 is outputted to the determination part 18 provided at the actuator operation amount computation part 15. The determination part 18 determines whether the operation amount computed at the actuator operation amount computation part 15 exceeds the fuel gas upper limit level corresponding to the set revolution speed, or not. When the operation amount exceeds the fuel gas upper limit level, an upper limit level setting part 181 provided at the determination part 18 limits the output of the actuator operation amount computation part 15. When the operation amount does not exceed the fuel gas upper limit level, the output of the actuator operation amount computation part 15 is outputted to the governor actuator 21.

It is configured such that the governor actuator 21 operates the gas flow rate adjustment valve 4 disposed in the fuel gas pipeline 3 based on the results of the actuator operation amount computation part 15 and the upper limit level setting part 18, thereby to control the fuel gas flow rate to the engine 1.

Figure 4:
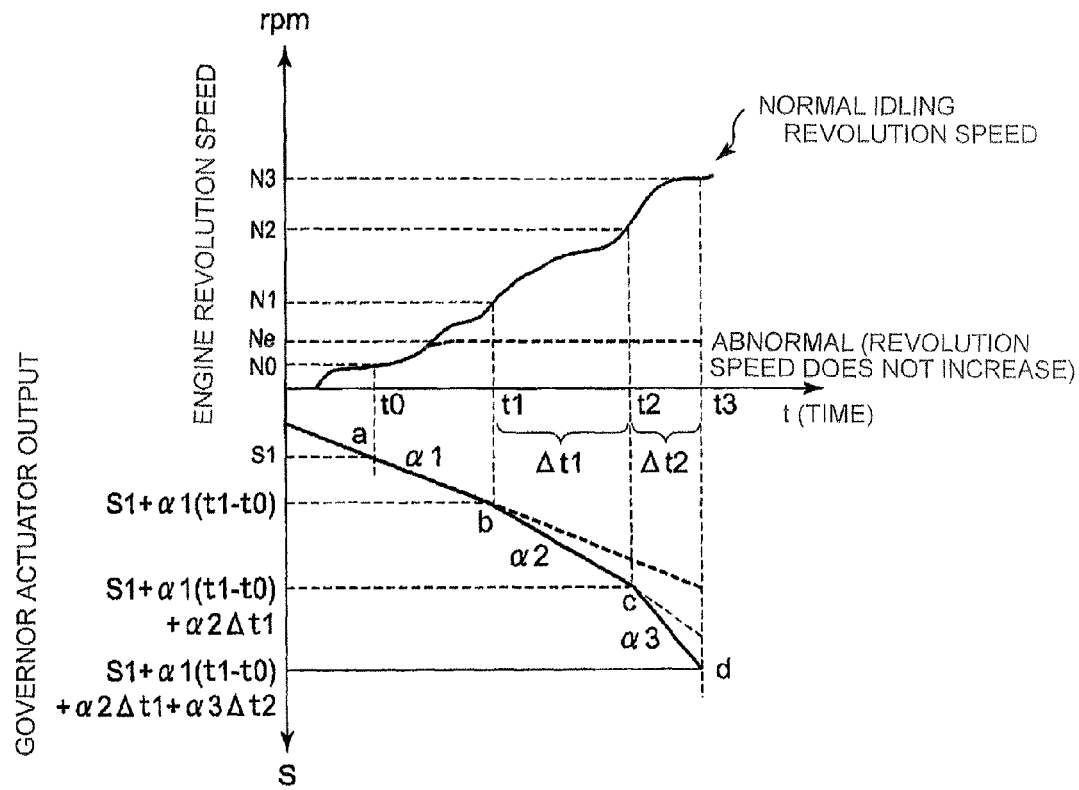
FIG. 4 is a diagram showing a change in engine revolution speed and a change in governor actuator output after the start of the gas engine in accordance with the embodiment of the present invention.

FIG. 4 shows the operation outline between the start and the idling revolution N3 at the engine 1, wherein the abscissa axis represents the time t, and the ordinate axis represents the engine revolution speed N (rpm) on the upper side with reference to the abscissa axis, and the governor actuator output S on the lower side thereof.

In the present embodiment, there is shown the case where the revolution speed transition point positions are set at two sites (N1 and N2) between the start and the idling revolution speed N3 by the transition point revolution speed setting part 12.

Upon start, the revolution speed is increased by the starting air until a given revolution speed position t0.

From the position of t0, the main chamber gas supply is started (point a in FIG. 4). The governor actuator output increases starting from the output S1 at the point a of the governor actuator 21 to the point b at a governor output increasing rate α1 with time. After time (t1−t0) (with t0 as the starting point), at the revolution speed transition point N1, the output of the governor actuator 21 becomes S1+α1×(t1−t0). When the engine revolution speed reaches N1, the output of the governor actuator changes into that at a governor output increasing rate α2.

Further, at t2 after Δt1 from time t1, the output of the governor actuator 21 becomes S1+α1×(t1−t0)+α2Δt1, and the engine revolution speed increases up to N2. When N2 is reached, the output of the governor actuator 21 changes into that at a governor output increasing rate α3.

After t3, the output of the governor actuator 21 becomes S1+α1×(t1−t0)+α2Δt1+α3Δt2, and the engine revolution speed N becomes N3, and reaches the idling revolution speed.

Figure 5:
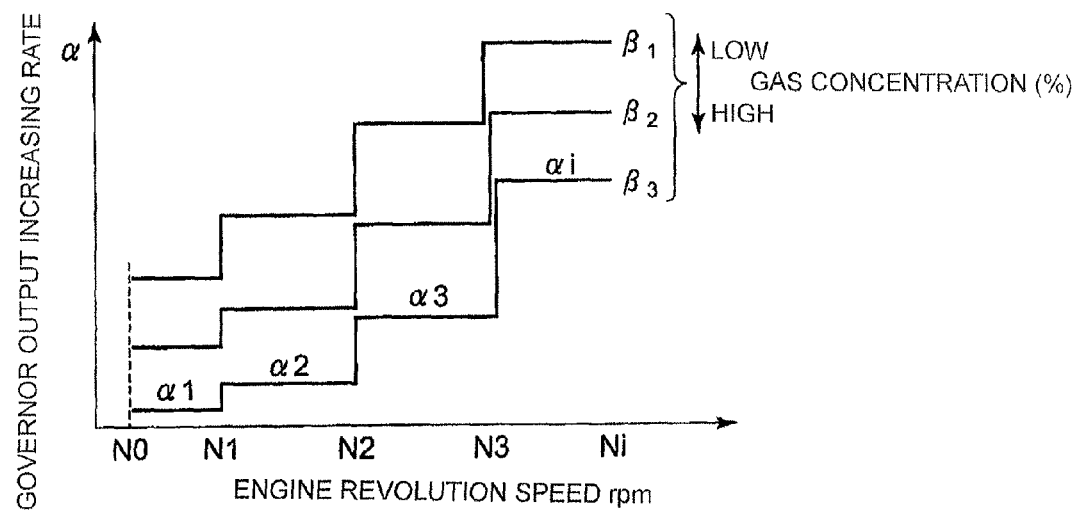
FIG. 5 shows an output map conceptual view of the governor output increasing rate according to the gas concentration and the engine revolution speed in accordance with the embodiment of the present invention.

FIG. 5 is the governor output increasing rate map 16, and shows an output map conceptual view of the governor output increasing rate α according to the gas concentration and the engine revolution speed (revolution speed transition point). A higher gas concentration results in a lower governor output increasing rate. A lower gas concentration results in a higher governor output increasing rate.

In FIG. 5, the gas concentrations are in the order of β3>β2>β1.

The data is inputted to the governor output increasing rate setting part 14, and goes through the governor output increasing rate change part 13 and the actuator operation amount computing part 15, thereby to operate the governor actuator 21. Thus, the gas flow rate adjustment valve 4 executes gas flow rate adjustment.

However, in FIG. 4, it may be assumed that the engine revolution speed N does not increase to Ne or higher even after a lapse of t1. This is caused by the following: incomplete combustion, improper air-fuel ratio of the fuel and the sucked air, or other problems may occur.

In that case, with the engine revolution speed kept at a revolution speed of Ne, the output of the governor actuator becomes S1+α1×(t3−t0) (at the time point of t3). Thus, the fuel gas continues to be supplied to the engine combustion chamber. As a result, enrichment of the fuel gas proceeds in the combustion chamber.

Figure 7:
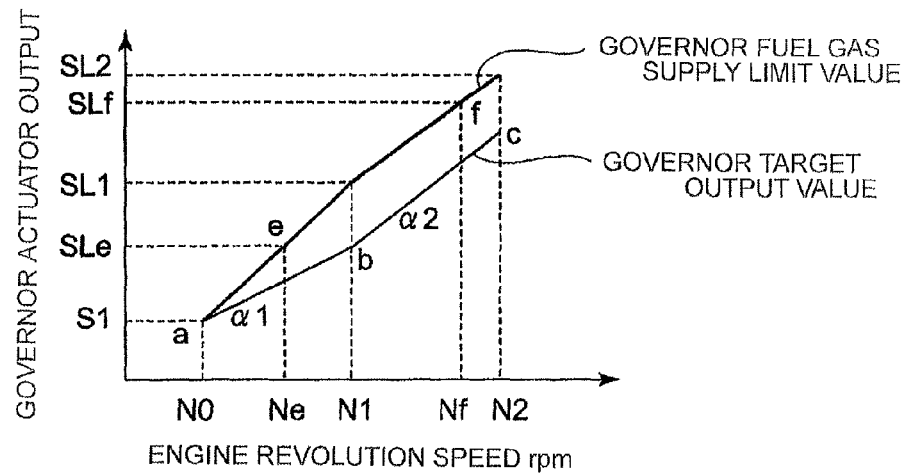
FIG. 7 shows an illustrative conceptual view of the fuel gas upper limit level of the governor actuator with respect to the engine revolution speed in accordance with the embodiment of the present invention.
Figure 8:
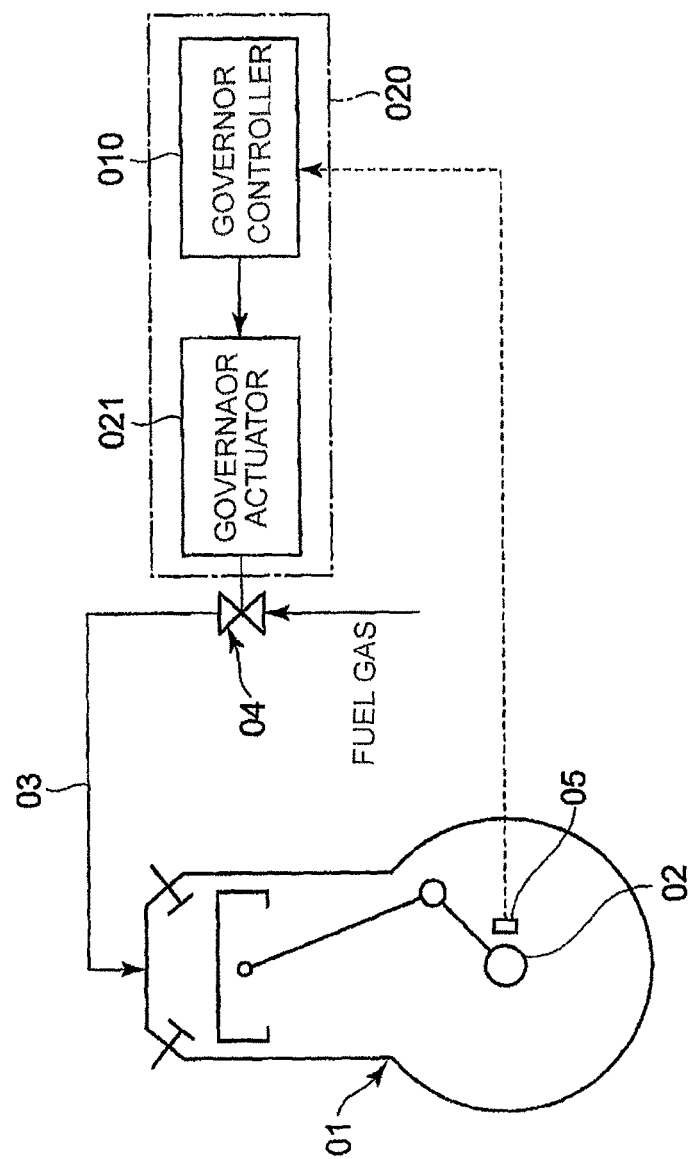
FIG. 8 shows a schematic view of a fuel control system in the related-art technology.
Figure 9:
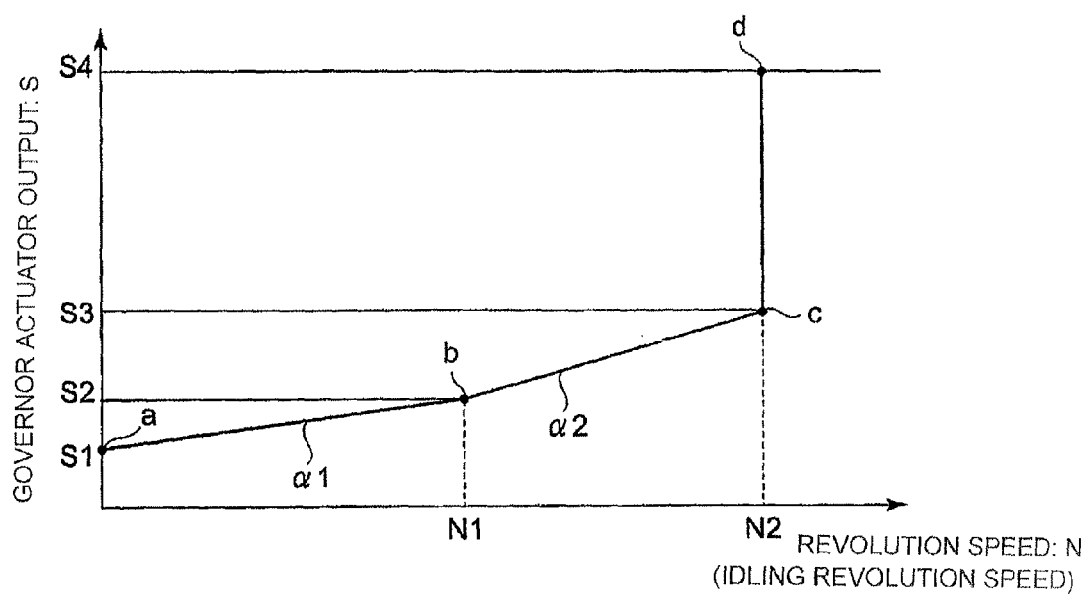
FIG. 9 is a diagram showing a change in engine revolution speed and a change in governor actuator output after the start of a gas engine in accordance with the related-art technology.

For example, upon start, after the start of the operation (t0) by the main chamber gas of the engine 1 after the revolution increase N0 (N zero) due to the starting air, the engine revolution speed does not increase from Ne even after a lapse of time t1 (see FIG. 4). In this case, for the governor actuator output, the output between the point a and the point e (FIG. 7) becomes S1+α1×(t3 −t0) (at the time point of t3). Thus, the supply of the fuel gas to the engine combustion chamber continues to be increased in proportion to the governor actuator output (S1+α1×(t3−t0)). Thus, in the present invention, as shown in FIG. 7, in order to prevent outputting of the point e or higher which is the upper limit level set value, for the output limiting value, the control of limiting the operation amount of the actuator operation amount computation part 15 is executed at the upper limit level setting part 181 of the determination part 18 provided at the actuator operation amount computation part 15.

The determination part 18 performs the control based on the fuel gas upper limit level map 17 provided in the ECU 8.

Figure 6:
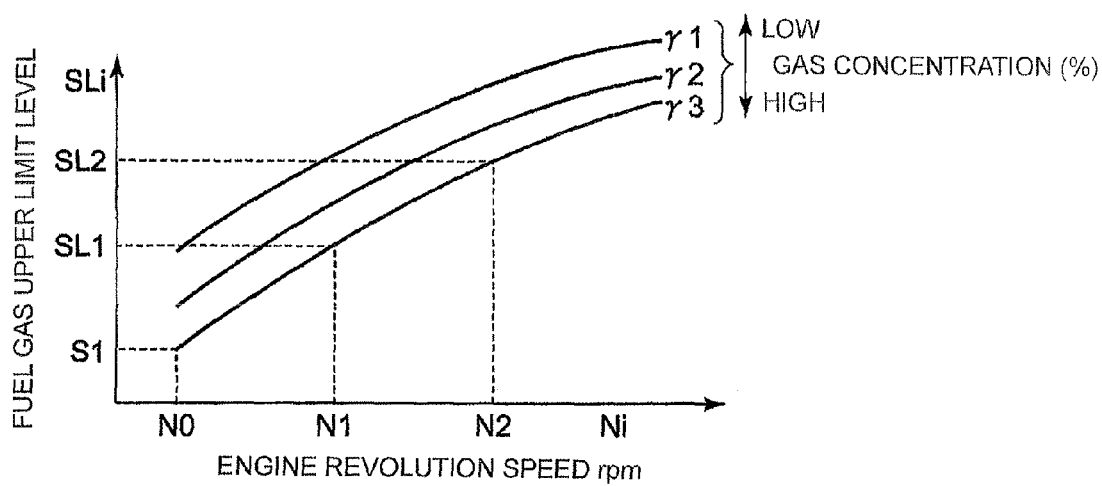
FIG. 6 shows an output map conceptual view of the fuel gas upper limit level according to the engine revolution speed of the present invention.

For each upper limit level set value, as shown in FIG. 6, the fuel gas upper limit level SLi corresponding to the engine revolution speed N (revolution speed transition point) is determined experimentally or by other methods for each fuel gas concentration. As a result, the fuel gas upper limit level map 17 is formed, and this is stored in the ECU 8 (see FIG. 2).

FIG. 6 shows a conceptual view of the fuel gas upper limit level map 17 for determining the fuel gas upper limit level, wherein for each engine revolution speed (revolution speed transition point), a higher gas concentration results in a lower fuel gas upper limit level, and a lower gas concentration results in a higher fuel gas upper limit level.

In FIG. 6, the gas concentrations are in the order of $\gamma 3 > \gamma 2 > \gamma 1$.

Incidentally, each fuel gas upper limit level (broken line) is assumed to be a value having a margin with respect to the air-to-fuel ratio causing abnormal combustion or misfire.

FIG. 7 shows an illustrative conceptual view of the fuel gas upper limit level of the governor actuator with respect to the engine revolution speed in accordance with the present embodiment.

Upon start, after the start of the operation (t0) by the main chamber gas of the engine 1 after the revolution increase N0 (N zero) due to the starting air, the output of the governor actuator 21 proceeds from the point a to the point b at α1. When the engine revolution speed does not increase to Ne or higher, the governor fuel gas upper limit level is up to SLe between S1 and SL1. Thus, a higher output is prevented.

Then, the engine revolution speed N smoothly increased from the point a to the point b at α1, but the engine revolution speed has not reached N2 between the point b and the point c, and does not increase to Nf or higher. In this case, the governor fuel gas upper limit level is up to SLf between SL1 and SL2. Thus, a higher output is prevented.

In the description by reference to FIG. 2, the following illustration was given: a diagram corresponding to each gas concentration is extracted from the governor output increasing rate map 16 and the fuel gas upper limit level map 17; then, the increasing rate α and the upper limit level SL are set according to the engine revolution speed from the diagram.

However, it is also acceptable that the increasing rate α and the upper limit level SL are extracted directly from the map base on the gas concentration detection and the revolution speed. (Such a description was given in the control flow of FIG. 3.)

Figure 3:
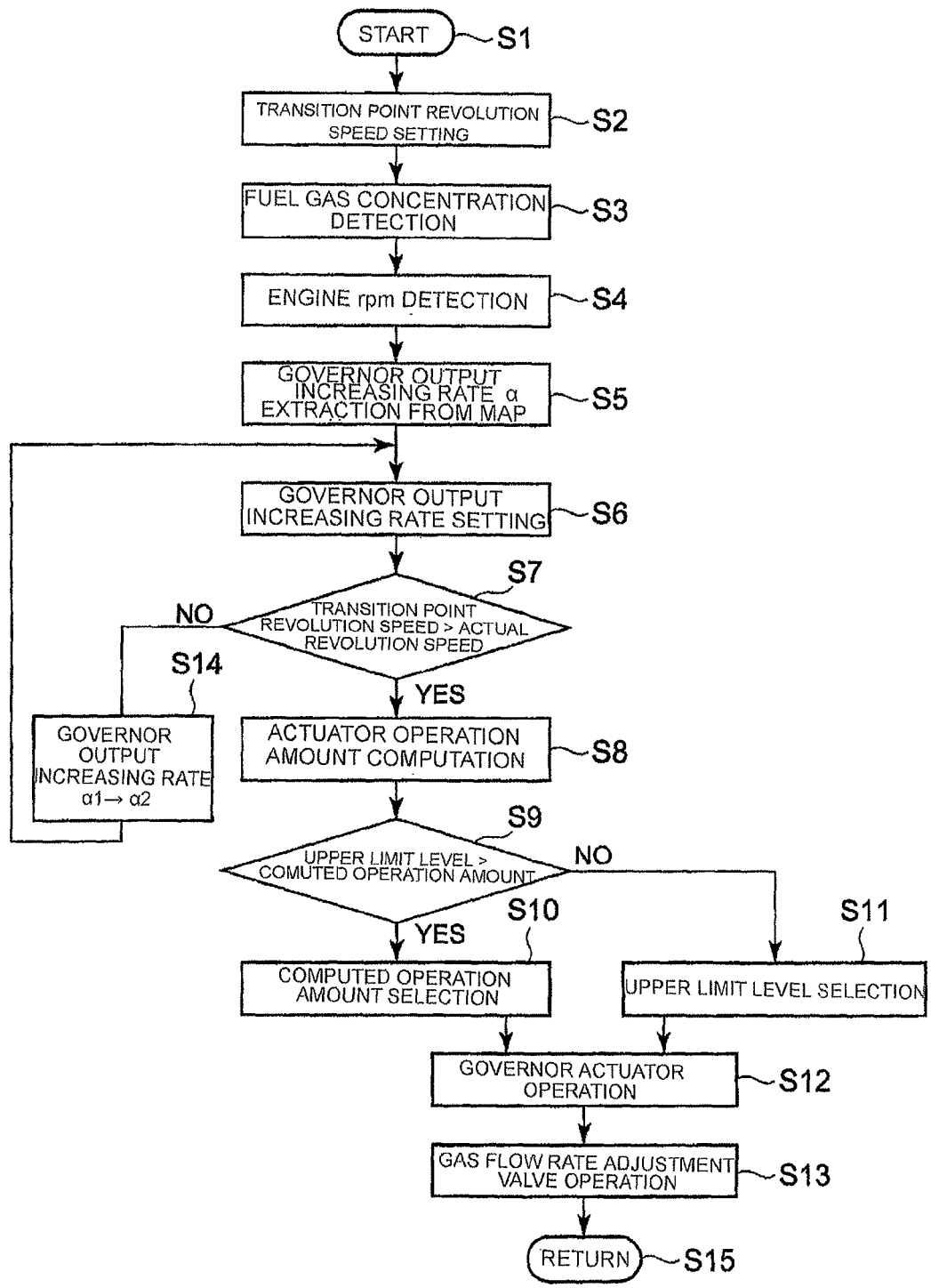
FIG. 3 shows a control flowchart of the fuel control device of the gas engine in accordance with the embodiment of the present invention.

FIG. 3 shows the control flowchart of the present embodiment. The process starts from Step S1. At Step S2, the revolution speed transition points N1, N2, and so on for gradually changing the increasing rate α and the upper limit level SL are preset at the transition point revolution speed setting part 12.

Then, at Step S3, the concentration of the gas concentration of the fuel gas (e.g., methane "$CH_4$") is detected, and outputted to the ECU 8. At Step S4, the engine revolution speed (rpm) is detected and outputted to the ECU 8. (Incidentally, the order of Steps S2 and S3 does not matter.) At Step S5, the governor output increasing rate α is extracted at the governor output increasing rate map 16 based on the gas concentration % and the engine revolution speed N, and is outputted to the governor output increasing rate setting part 14. At Step S6, the governor output increasing rate setting part 14 determines the governor output increasing rate α. At Step S7, the revolution speed transition point N1 and the actual revolution speed are compared. When the revolution speed transition point N1>the actual revolution speed, YES is selected, and the process proceeds to Step S8. (In the case where the actual engine revolution speed falls within the section (N0 to N1) set at the revolution speed transition point setting part 12)

Whereas, when the revolution speed transition point N1<the actual revolution speed, (when the actual engine revolution speed shifts from the section (N0 to N1) to (N1 to N2) set at the revolution speed transition point setting part 12), NO is selected, and the process proceeds to Step S14. At the Step 14, the governor output increasing rate is changed from α1 to α2, and the process returns to the Step S6.

When the revolution speed transition point N1>the actual revolution speed, in the Step S8, at the actuator operation amount computation part 15, the computation of the actuator operation amount is executed. At Step S9, the fuel gas upper limit level and the computed actuator operation amount are compared.

When the fuel gas upper limit level SLi (herein, resulting in SLi linearly interpolated between S1 and SL1)>the computed operation amount, it is determined that the fuel gas upper limit level SLi is not reached. Thus, YES is selected, and the process proceeds to Step S10. In the Step S10, the computed operation amount is selected.

On the other hand, when the fuel gas upper limit level SLi<the computed operation amount, it is determined that the fuel gas upper limit level SLi is reached. Thus, the process proceeds to Step S11. In the Step S11, a more increase in fuel gas supply ratio causes misfire, abnormal combustion, or the like. For this reason, the upper level setting part 18 operates, so that the fuel gas limiting value is selected.

In Step S12, the governor actuator 21 operates based on the result of the Step S10 or the Step S11. At the Step S13, the gas flow rate adjustment valve 4 is operated, so that control of the fuel gas supply to the engine 1 is performed.

By the procedure as described above, the concentration of the fuel gas is detected at every revolution speed transition point from the engine start to the idling revolution speed. Based on the concentration, the governor output increasing rate is changed, and a fuel gas supply limit value is provided at every revolution speed transition point. As a result, the fuel gas rich or lean condition in the combustion chamber is prevented. This prevents the abnormal combustion, misfire, or the like of the fuel gas. As a result, it is possible to carry out the increase in revolution speed from the engine start to the idling revolution speed at a high speed and with reliability.

Further, also in the case using a fuel gas which tends to fluctuate in fuel gas concentration such as coal mine gas, a fuel gas supply limit value is provided at every section (N0 to N1), (N1 to N2), and (N2 to N3) set at the revolution speed transition point setting part 12. This inhibits not only misfire due to the reduction of the methane gas concentration, but also useless fuel gas discharge. Accordingly, favorable effects are exerted on the energy conservation, environment, and the like.

INDUSTRIAL APPLICABILITY

The present invention is desirably used for a gas engine control device which enables an increase in revolution speed from the engine start to the idling revolution speed to be carried out with reliability and at a high speed in the following manner: methane or the like generated in tunnels in a coal mine or the like is directly introduced as a fuel gas into a cylinder (combustion chamber), and the fuel gas introduction amount is changed based on the concentration of the fuel gas to be introduced.

EXPLANATION OF REFERENCE NUMERALS

- 1 Engine
- 3 Fuel gas pipeline
- 4 Gas flow rate adjustment valve
- 5 Revolution detector
- 6 Fuel gas supply part
- 7 Gas concentration detection part
- 8 ECU (engine control unit)
- 10 Governor controller
- 12 Revolution speed transition point setting part
- 13 Governor output increasing rate change part
- 14 Governor output increasing rate setting part
- 15 Actuator operation amount computation part
- 16 Governor output increasing rate map
- 17 Fuel gas flow rate limit level map
- 21 Governor actuator

The invention claimed is:

1. A control device of a gas engine using a fuel gas that exhibits gas concentration change,
the device comprising:
a revolution speed detection part detecting a revolution speed of the gas engine,
a gas concentration detection unit detecting a gas concentration of the fuel gas,
a gas flow rate adjustment valve disposed in a fuel gas pipeline supplying the fuel gas to the gas engine,
a governor actuator operating the gas flow rate adjustment valve, and
a governor controller including an operation amount computation part computing an operation amount of the governor actuator according to the gas concentration of the fuel gas detected by the gas concentration detection unit upon starting the gas engine, this governor controller operating the governor actuator based on the operation amount computed by the operation amount computation part.

2. The gas engine control device according to claim 1, comprising a first map in which an increasing rate of the operation amount of the governor actuator on starting the gas engine is prescribed according to the gas concentration of the fuel gas,
wherein the governor controller includes a governor output increasing rate setting part reading from the first map the increasing rate of the operation amount of the governor actuator corresponding to the gas concentration of the fuel gas detected by the gas concentration detection unit, and
the operation amount computation part computes the operation amount of the governor actuator based on the increasing rate.

3. The gas engine control device according to claim 2,
wherein in the first map a plurality of increasing rates are prescribed according to the revolution speed of the gas engine, and
the operation amount computation part computes the operation amount of the governor actuator based on the increasing rate corresponding to the revolution speed detected by the revolution speed detection part.

4. The gas engine control device according to claim 1,
wherein the governor controller includes:
an upper limit level setting part setting an upper limit value of the operation amount of the governor actuator according to the gas concentration of the fuel gas and the revolution speed detected by the revolution speed detection part; and
a determination part comparing the operation amount computed by the operation amount computation part and the upper limit value of the operation amount, and operating the governor actuator based on the upper limit value when the operation amount is equal to or larger than the upper limit value.

5. The gas engine control device according to claim 4, comprising a second map in which the upper limit value of the operation amount is prescribed according to the gas concentration of the fuel gas and the revolution speed of the gas engine,
wherein the upper limit level setting part reads from the second map the upper limit value corresponding to the gas concentration detected by the gas concentration detection unit, and sets the upper limit value of the operation amount.

6. The gas engine control device according to claim 5,
wherein the second map includes a diagram prescribing the upper limit value between a revolution speed corresponding to operation start by a main chamber gas and a revolution speed corresponding to idling, with the upper limit value being increased according to an increase in the revolution speed.

7. A gas engine comprising the control device according to claim 1.

* * * * *